US010313004B2

(12) United States Patent
Lee et al.

(10) Patent No.: US 10,313,004 B2
(45) Date of Patent: Jun. 4, 2019

(54) SIGNAL EXCHANGE EQUIPMENT AND METHOD FOR TIME DIVISION DUPLEX AND FREQUENCY DIVISION DUPLEX CARRIER AGGREGATION IN WIRELESS COMMUNICATION SYSTEM

(71) Applicant: Samsung Electronics Co., Ltd., Suwon-si, Gyeonggi-do (KR)

(72) Inventors: Hee-Kwang Lee, Suwon-si (KR); Il-Won Kwon, Seoul (KR); Seung-Joo Maeng, Seongnam-si (KR); Jae-Ho Jeon, Seongnam-si (KR); Jung-Ah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 15/129,289

(22) PCT Filed: Mar. 26, 2015

(86) PCT No.: PCT/KR2015/002941
§ 371 (c)(1),
(2) Date: Sep. 26, 2016

(87) PCT Pub. No.: WO2015/147557
PCT Pub. Date: Oct. 1, 2015

(65) Prior Publication Data
US 2017/0117956 A1 Apr. 27, 2017

Related U.S. Application Data

(60) Provisional application No. 61/970,528, filed on Mar. 26, 2014, provisional application No. 61/978,494, (Continued)

(30) Foreign Application Priority Data

May 2, 2014 (KR) .................. 10-2014-0053703
May 7, 2014 (KR) .................. 10-2014-0054218

(51) Int. Cl.
*H04B 7/26* (2006.01)
*H04L 5/00* (2006.01)
(Continued)

(52) U.S. Cl.
CPC .......... *H04B 7/2615* (2013.01); *H04L 5/001* (2013.01); *H04L 5/003* (2013.01); *H04L 5/0091* (2013.01);
(Continued)

(58) Field of Classification Search
None
See application file for complete search history.

(56) References Cited

U.S. PATENT DOCUMENTS 9,936,487 B2 4/2018 Yang et al.
2011/0195704 A1 8/2011 Choi et al.
(Continued)

FOREIGN PATENT DOCUMENTS

CN 103404047 A 11/2013
CN 103444118 A 12/2013
(Continued)

OTHER PUBLICATIONS

Texas Instruments, On L1 Signaling for Dynamic TDD UL/DL Reconfiguration, 3GPP TSG RAN WG1 #76, Prague, Czech Republic, Feb. 10-14, 2014, R1-140531.
(Continued)

*Primary Examiner* — Yaotang Wang
(74) *Attorney, Agent, or Firm* — Jefferson IP Law, LLP

(57) ABSTRACT

An apparatus for a terminal in a wireless communication system includes a receiver configured to receive frame configuration information used by a second carrier which is operated using a Time Division Duplex (TDD) scheme and receive downlink data through downlink TDD-Frequency Division Duplex (FDD) Carrier Aggregation (CA) using a
(Continued)

first carrier and the second carrier operated using an FDD scheme and a transmitter configured to transmit uplink data via the first carrier. The downlink data received via the second carrier is received through a downlink subframe identified by the frame configuration information.

17 Claims, 19 Drawing Sheets

Related U.S. Application Data filed on Apr. 11, 2014, provisional application No. 61/983,712, filed on Apr. 24, 2014.

(51) Int. Cl.
  *H04W 8/24* (2009.01)
  *H04W 88/02* (2009.01)
  *H04W 88/08* (2009.01)
(52) U.S. Cl.
  CPC .............. *H04W 8/24* (2013.01); *H04W 88/02* (2013.01); *H04W 88/08* (2013.01)

(56) References Cited

U.S. PATENT DOCUMENTS

| | | |
|---|---|---|
| 2011/0286370 A1 | 11/2011 | Tang et al. |
| 2012/0106404 A1 | 5/2012 | Damnjanovic |
| 2012/0257524 A1 | 10/2012 | Chen et al. |
| 2012/0322455 A1 | 12/2012 | Oh |
| 2013/0315114 A1 | 11/2013 | Seo et al. |
| 2013/0343239 A1 | 12/2013 | Damnjanovic et al. |
| 2014/0003258 A1 | 1/2014 | Schmitt |
| 2014/0003303 A1 | 1/2014 | Yang et al. |
| 2014/0010086 A1 | 1/2014 | Etemad et al. |
| 2014/0010125 A1 | 1/2014 | Tillman et al. |
| 2014/0029484 A1 | 1/2014 | Choi et al. |
| 2014/0031054 A1 | 1/2014 | Zou et al. |
| 2014/0036818 A1 | 2/2014 | Koskela et al. |
| 2014/0043979 A1 | 2/2014 | Etemad et al. |
| 2014/0044105 A1 | 2/2014 | Bontu et al. |
| 2014/0050127 A1 | 2/2014 | Wang et al. |
| 2014/0071937 A1 | 3/2014 | Klatt |
| 2014/0071976 A1 | 3/2014 | Anand et al. |
| 2014/0078942 A1 | 3/2014 | Noh et al. |
| 2014/0086078 A1 | 3/2014 | Malladi et al. |
| 2014/0153449 A1 | 6/2014 | Seo et al. |
| 2015/0055521 A1 | 2/2015 | Seo et al. |
| 2015/0117275 A1 | 4/2015 | Park |
| 2016/0065350 A1* | 3/2016 | Suzuki .................. H04W 28/18 370/329 |
| 2016/0142991 A1 | 5/2016 | Classon et al. |
| 2017/0005770 A1* | 1/2017 | Shimezawa .............. H04L 1/00 |
| 2017/0353204 A1* | 12/2017 | He ..................... H04W 72/048 |

FOREIGN PATENT DOCUMENTS

| | | |
|---|---|---|
| CN | 103460635 A | 12/2013 |
| EP | 2688237 A2 | 1/2014 |
| EP | 2697926 | 2/2014 |
| EP | 2835918 A1 | 2/2015 |
| WO | 2012061410 A2 | 5/2012 |
| WO | 2012109195 A2 | 8/2012 |
| WO | 2012142128 A2 | 10/2012 |
| WO | 2013151396 A1 | 10/2013 |
| WO | 2013/170426 A1 | 11/2013 |
| WO | 2013/192601 A2 | 12/2013 |
| WO | 2014/007595 A1 | 1/2014 |

OTHER PUBLICATIONS

Catt et al., Introduction of DRX for TDD eITMA—Alternative 1, Change Request, 3GPP TSG-RAN WG2 Meeting #85, Prague, Czech Republic, Feb. 10-14, 2014, R2-140105.

3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.331, V10.0.0, Dec. 2010, pp. 1-276, 3GPP, Valbonne, France.

RAN WG1, LS on RAN1 TDD-FDD CA Status and Related RRC Impact, 3GPP TSG RAN WG1 Meeting #76, Prague, Czech Republic, Feb. 10-14, 2014, Release 12, R1-141065.

Sharp, TDD-FDD Carrier Aggregation Solution, 3GPP TSG RAN WG1 Meeting #74bis, Guangzhou, China, Oct. 7-11, 2013, R1-134473.

LG Electronics, Basic Assumptions and Requirements for TDD-FDD CA, 3GPP TSG RAN WG1 Meeting #75, San Francisco, USA, Nov. 11-15, 2013, pp. 1-4, R1-135463.

Sharp, Deployment Scenarios and Requirements for TDD-FDD CA, 3GPP TSG RAN WG1 Meeting #74, Barcelona, Spain, Aug. 19-23, 2013, pp. 1-3, R1-133232.

Sharp, Development scenarios and requirements for TDD-FDD CA, 3GPP TSG RAN WG1 Meeting #74, R1-133232, Aug. 19-23, 2013, Barcelona, Spain.

LTE; Evolved Universal Terrestrial Radio Access (E-UTRA); User Equipment (UE) radio transmission and reception (3GPP TS 36.101 version 11.6.0 Release 11), ETSI TS 136 101, V11.6.0 (Oct. 2013).

CATT, Half duplex UE operation for FDD-TDD CA, 3GPP TSG RAN WG1 Meeting #76, R1-140105, Feb. 10-14, 2014, Prague, Czech Republic.

Chinese Office Action dated Jan. 25, 2019, issued in the Chinese Application No. CN201580022232.X.

U.S. Office Action dated Jan. 7, 2019, issued in the U.S. Appl. No. 15/129,275.

\* cited by examiner

◯ ⃝ : TDD coverage including uplink

| Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D : Downlink subframe (602)

U : Uplink subframe (604)

S : Special subframe (606)

FIG.6

SIGNAL EXCHANGE EQUIPMENT AND METHOD FOR TIME DIVISION DUPLEX AND FREQUENCY DIVISION DUPLEX CARRIER AGGREGATION IN WIRELESS COMMUNICATION SYSTEM

TECHNICAL FIELD

The present invention is to support Carrier Aggregation (CA) using a plurality of carriers in a wireless communication system.

BACKGROUND ART

Advantages and disadvantages of Frequency Division Duplex (FDD) and Time Division Duplex (TDD) are as follows. The FDD is suitable for a service such as voice which generates symmetric traffic, and the TDD is suitable for a service such as Internet or data, which is bursty and has asymmetric traffic. The TDD utilizes a spectrum more efficiently. The FDD cannot be used in an environment where a service provider has no sufficient bandwidth for offering a guardband required between transmit and receive channels. The TDD is more flexible than the FDD in satisfying a demand for dynamically configuring an uplink and a downlink in response to customer needs.

Carrier Aggregation (CA) is a technique defined in a Long Term Evolution (LTE)-Advanced (A) system. The CA enables aggregation of multiple carriers so as to attain a wider overall system bandwidth. Thus, a peak data rate of the system can increase. In current, only the CA of TDD carriers and the CA of FDD carriers are supported and there are no standards or techniques for combining the TDD carriers and the FDD carriers.

DISCLOSURE OF INVENTION

Technical Problem

An embodiment of the present invention provides a Time Division Duplex (TDD)-Frequency Division Duplex (FDD) Carrier Aggregation (CA) operation method in a wireless communication system.

An embodiment of the present invention provides a signaling method for TDD-FDD CA in a wireless communication system.

An embodiment of the present invention provides a method for improving base station connection efficiency of a terminal in TDD-FDD CA operation in a wireless communication system.

Solution to Problem

According to an embodiment of the present invention, an apparatus of a terminal in a wireless communication system includes a receiver configured to receive frame configuration information used by a second carrier which is operated using a Time Division Duplex (TDD) scheme, and receive downlink data through downlink TDD-Frequency Division Duplex (FDD) Carrier Aggregation (CA) using a first carrier and the second carrier operated using an FDD scheme, and a transmitter configured to transmit uplink data via the first carrier, wherein the downlink data received via the second carrier is received through a downlink subframe identified by the frame configuration information.

According to an embodiment of the present invention, an apparatus of a base station in a wireless communication system includes a transmitter configured to transmit frame configuration information used by a second carrier which is operated using a TDD scheme, and transmit downlink data through downlink TDD-FDD CA using a first carrier and the second carrier operated using an FDD scheme, and a receiver configured to receive uplink data via the first carrier, wherein the downlink data transmitted via the second carrier is transmitted through a downlink subframe identified by the frame configuration information.

According to an embodiment of the present invention, a method for operating a terminal in a wireless communication system includes receiving frame configuration information used by a second carrier which is operated using a TDD scheme, receiving downlink data through downlink TDD-FDD CA using a first carrier and the second carrier operated using an FDD scheme, and transmitting uplink data via the first carrier, wherein the downlink data received via the second carrier is received through a downlink subframe identified by the frame configuration information.

According to an embodiment of the present invention, a method for operating a base station in a wireless communication system includes transmitting frame configuration information used by a second carrier which is operated using a TDD scheme, transmitting downlink data through downlink TDD-FDD CA using a first carrier and the second carrier operated using an FDD scheme, and receiving uplink data via the first carrier, wherein the downlink data transmitted via the second carrier is transmitted through a downlink subframe identified by the frame configuration information.

An apparatus of a terminal in a wireless communication system includes a transmitter for transmitting to a base station, information notifying that CA using an FDD carrier and a TDD carrier is supported, and a receiver for receiving cell configuration information including TDD subframe information from the base station According to an embodiment of the present invention, an apparatus of a base station in a wireless communication system includes a receiver for receiving from a terminal, information notifying that CA using an FDD carrier and a TDD carrier is supported, and a transmitter for transmitting cell configuration information including TDD subframe information to the terminal.

According to an embodiment of the present invention, a method of a terminal in a wireless communication system includes transmitting to a base station, information notifying that CA using an FDD carrier and a TDD carrier is supported, and receiving cell configuration information including TDD subframe information from the base station According to an embodiment of the present invention, a method of a base station in a wireless communication system includes receiving from a terminal, information notifying that CA using an FDD carrier and a TDD carrier is supported, and transmitting cell configuration information including TDD subframe information to the terminal.

Advantageous Effects of Invention

According to an embodiment of the present invention, a terminal capable of supporting Time Division Duplex (TDD)-Frequency Division Duplex (FDD) can effectively achieve Carrier Aggregation (CA) in a wireless communication system.

The wireless communication system can support the CA combining FDD carriers and TDD carriers. In particular, a TDD coverage, particularly, a TDD coverage using a high frequency is more restricted by an uplink coverage than an FDD coverage. Hence, in this case, uplink communication is performed only over an FDD cell and thus the TDD coverage is expanded. Therefore, the FDD-TDD CA area can expand and a downlink data rate can improve.

BRIEF DESCRIPTION OF DRAWINGS

FIG. 6 depicts examples of various structures of a TDD Frame in a wireless communication system according to an embodiment of the present invention.

BEST MODE FOR CARRYING OUT THE INVENTION

Figure 1:
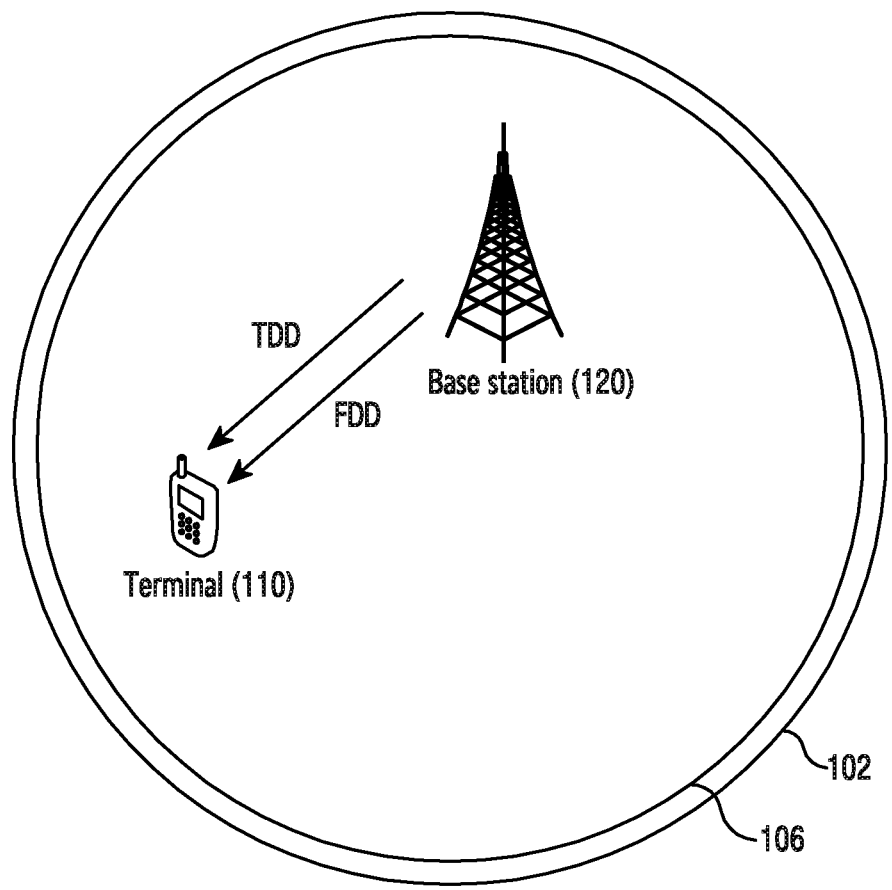
FIG. 1 depicts a configuration example of a Frequency Division Duplex (FDD) cell and a Time Division Duplex (TDD) cell in a wireless communication system according to an embodiment of the present invention.

Hereinafter, an operational principle of the present invention is described in detail with reference to the accompanying drawings. In the following description, well-known functions or constitutions will not be described in detail if they would unnecessarily obscure the invention. Also, terminologies to be described below are defined in consideration of functions in the present invention and may vary depending on a user's or an operator's intention or practice. Thus, their definitions should be defined based on all the contents of the specification.

Hereinafter, the present invention describes a technique for Carrier Aggregation (CA) of a Frequency Division Duplex (FDD) cell and a Time Division Duplex (TDD) cell in a wireless communication system. In the following, terms for identifying cells used, terms indicating network entities, and terms indicating connection states are for the sake of explanations. Accordingly, the present invention is not limited to the terms to be described, and can use other terms indicating objects having technically identical meaning.

Hereafter, to ease the understanding, the present invention employs terms and names defined in Long Term Evolution (LTE) standard. However, the present invention is not limited to the terms and the names, and can be equally applied to systems conforming to other standards.

Hereinafter, an operational principle of the present invention will be described in detail with reference to the accompanying drawings. In the following description, well-known functions or constitutions will not be described in detail if they would unnecessarily obscure the invention. Also, terminologies to be described below are defined in consideration of functions in the present invention and may vary depending on a user's or an operator's intention or practice. Thus, their definitions should be defined based on all the contents of the specification.

Hereafter, terms indicating connection states, which are used to identify carriers, cells, signaling procedures, and network entities, are for the sake of the understanding. Accordingly, the present invention is not limited to the terms to be described, and can use other terms indicating objects having technically identical meaning.

Hereafter, to ease the understanding, the present invention adopts terms and names defined in LTE standard. However, the present invention is not limited to the terms and the names, and can be equally applied to systems conforming to other standards.

Various embodiments of the present invention relate to a technique for supporting CA of a TDD carrier and an FDD carrier. The CA of the TDD and FDD carriers allows providers to utilize all of available spectrum resources, and can also offer system flexibility and performance benefit. That is, since the FDD and TDD spectrums can be utilized more flexibly, lack of the spectrum resources can be considerable mitigated. Further, the FDD and TDD CA can have advantages in supporting asymmetric traffic.

Frequency bands used for communication are divided in advance into a frequency band for a TDD cell and a frequency band for an FDD cell. Generally, the FDD cell is allocated to a lower frequency band. Accordingly, the FDD cell can be disadvantageous in terms of a data rate but can be advantageous in terms of coverage. The TDD cell is allocated to a high frequency band. Accordingly, the TDD cell can be disadvantageous in terms of the coverage but can be advantageous in terms of the data rate. Hence, a system according to various embodiments of the present invention supports uplink communication over the FDD cell which uses a relatively lower frequency band and supports downlink communication over both of the FDD cell and the TDD cell by using the advantages of the TDD cell and the FDD Cell.

Hereafter, the present invention assumes that the FDD cell uses a lower frequency band, and various embodiments of the present invention support the uplink communication over the FDD cell. However, when the TDD cell uses a lower frequency band, the system according to other embodiments of the present invention can support the uplink communication over the TDD cell.

The system according to an embodiment of the present invention can support the FDD-TDD CA by further allocating an additional TDD carrier to a terminal which can recognize an FDD carrier. In so doing, the TDD carrier can belong to a licensed band or an unlicensed band. Alternatively, the system according to an embodiment of the present invention can support the FDD-TDD CA by allocating a TDD carrier and an FDD carrier to a terminal which can recognize both of the FDD carrier and the TDD carrier.

Figure 2:
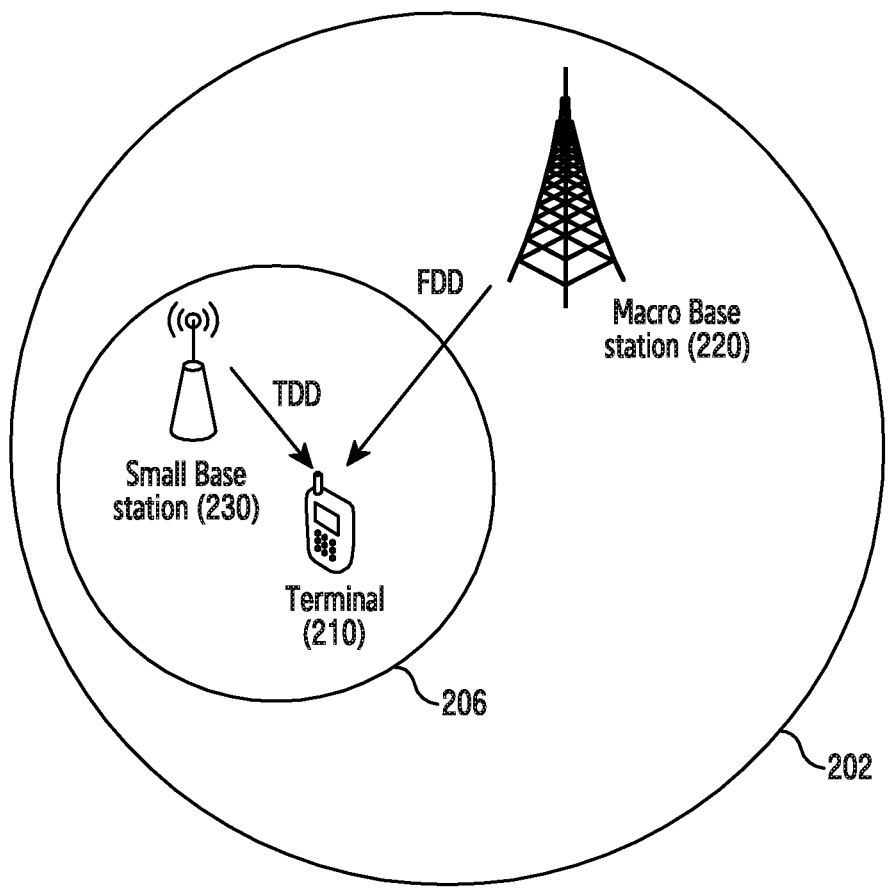
FIG. 2 depicts another configuration example of an FDD cell and a TDD cell in a wireless communication system according to an embodiment of the present invention.

FIG. 1 depicts a configuration example of a FDD cell and a TDD cell in a wireless communication system according to an embodiment of the present invention. Referring to FIG. 1, one base station 120 provides both of an FDD cell 102 and a TDD cell 106 to a terminal 110. The base station 120 can be a macro base station. Accordingly, the FDD cell 102 and the TDD cell 106 can have similar coverage FIG. 2 depicts another configuration example of an FDD cell and a TDD cell in a wireless communication system according to an embodiment of the present invention. Referring to FIG. 2, a terminal 210 is offered a FDD cell 202 from a macro base station 220 and a TDD cell 206 from a small base station 230. Hence, the TDD cell 206 can be included in the FDD cell 202, and a hierarchical cell structure can be built. Yet, according to another embodiment of the present invention, the FDD-TDD CA can be performed even when the whole coverage of the small base station 230 is not included in the coverage of the macro base station 220, rather than the small base station 230 co-located with the coverage of the macro base station 220 as shown in FIG. 2.

The coverage of the cell can be greatly restricted by uplink coverage. This is because an uplink signal is transmitted by a terminal of which power is greatly limited. Also, due to limits on uplink/downlink configuration, when the TDD wants to obtain the same uplink data rate as the FDD, the terminal needs to transmit more uplink data over a certain period than the FDD cell. Hence, a Modulation and Coding Scheme (MCS) level or an allocated bandwidth in the TDD cell needs to be higher than the FDD cell. As a result, the uplink coverage of the TDD cell gets smaller than the uplink coverage of the FDD cell, and the coverage of the TDD cell is greatly limited by the uplink coverage.

Figure 3A:
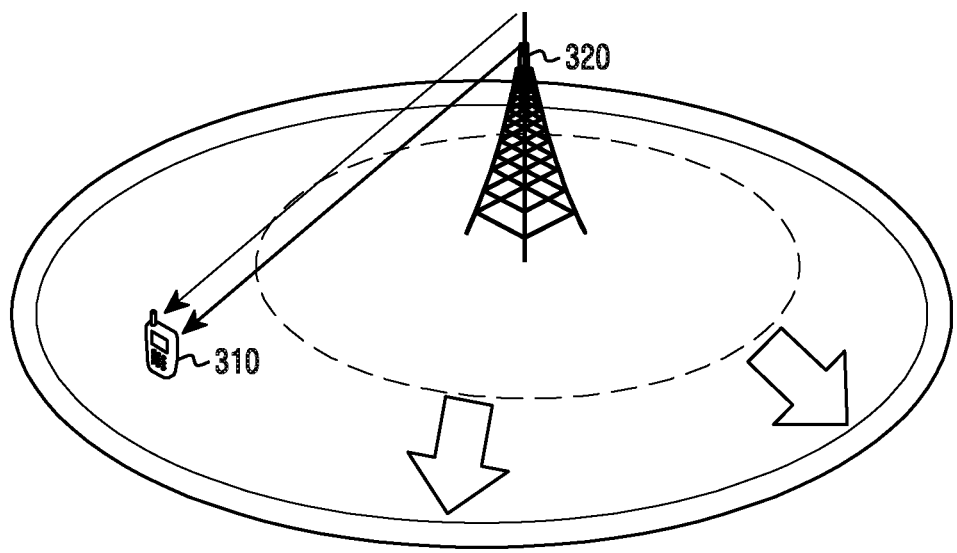
FIGS. 3A and 3B depict coverage of an FDD cell and a TDD Cell in a wireless communication system according to an embodiment of the present invention.
Figure 3B:
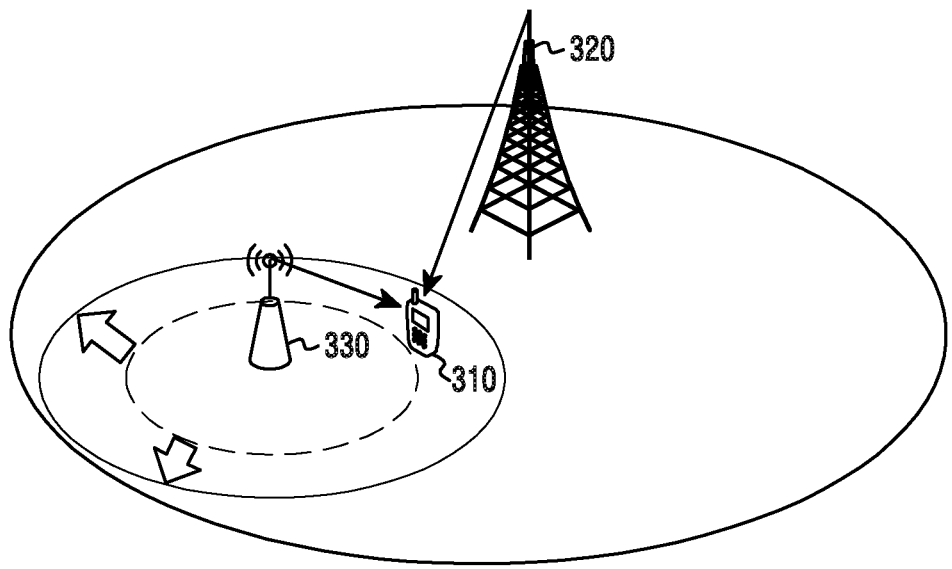

FIGS. 3A and 3B depict coverage of an FDD cell and a TDD Cell in a wireless communication system according to an embodiment of the present invention. FIG. 3A depicts a case where a macro base station 320 offers both of the FDD cell and the TDD cell, and FIG. 3B depicts a case where the macro base station 320 offers the FDD cell and a small base station 330 offers the TDD cell. Referring to FIGS. 3A and 3B, TDD coverage including an uplink is smaller than the TDD coverage according to an embodiment of the present invention. That is, a system according to various embodiments of the present invention can expand the TDD cell coverage by performing uplink communication over the FDD cell. Hence, even when a terminal is located outside the uplink coverage of the TDD cell, it can operate CA including the TDD cell.

Figure 4:
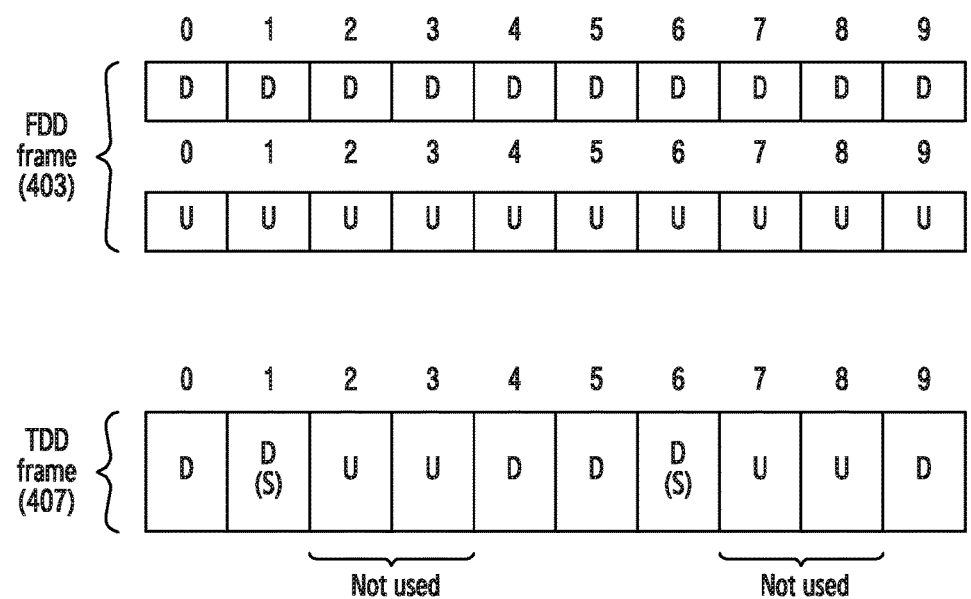
FIG. 4 depicts a frame structure example of an FDD cell and a TDD cell in a wireless communication system according to an embodiment of the present invention.

FIG. 4 depicts an example of FDD cell and TDD cell frame structures in a wireless communication system according to an embodiment of the present invention.

Referring to FIG. 4, an FDD frame 403 and a TDD frame 407 each include ten subframes. The FDD frame 403 includes ten downlink subframes and ten uplink subframes divided on a frequency axis, and the TDD frame 407 includes six downlink subframes and four uplink subframes. In so doing, the four uplink subframes are not used by a terminal operating the FDD-TDD CA. That is, the terminal of an FDD-TDD CA operation can be allocated all of downlink and uplink resources of the FDD frame 403 but uplink resources of the TDD frame 407 are excluded from the allocation. That is, in the TDD-FDD CA operation, the uplink communication uses only resources of the FDD frame 403. More specifically, to achieve a coverage expansion effect of the TDD cell, the terminal can transmit control information to be transmitted over a control channel (e.g., Physical Uplink Control Channel (PUCCH)) of the TDD, over the uplink subframe of the FDD Frame 403. Yet, the uplink subframes of the TDD frame 407 can be used by other terminals connected to a corresponding TDD cell but not operating the TDD-FDD CA.

Figure 5:
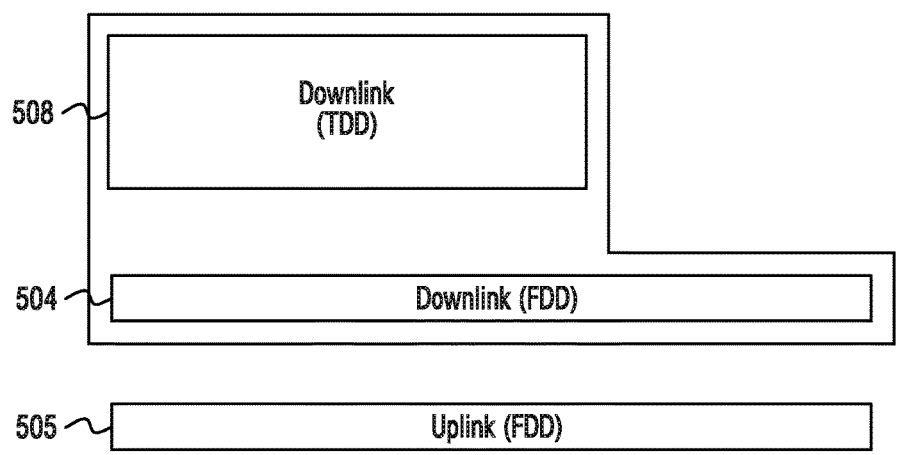
FIG. 5 depicts an available amount of downlink resources and uplink resources in a wireless communication system according to an embodiment of the present invention.

An available amount of the downlink resources and the uplink resources according to the frame structure of FIG. 4 is depicted in FIG. 5.

FIG. 5 depicts an available amount of downlink resources and uplink resources in a wireless communication system according to an embodiment of the present invention. As shown in FIG. 5, downlink resources 504 of an FDD cell and downlink resources 508 of a TDD cell can be allocated for downlink communication, and uplink resources 505 of the FDD cell can be allocated for uplink communication. Hence, the available amount of the downlink resources greatly increases without reducing cell coverage.

The TDD frame 407 of FIG. 4 includes the six downlink subframes and the four uplink subframes. The rate of the downlink subframes and the uplink subframes in the TDD frame 407 can vary according to a specific embodiment. For example, TDD frames of FIG. 6 can be used.

FIG. 6 depicts examples of various structures of a TDD Frame in a wireless communication system according to an embodiment of the present invention. Referring to FIG. 6, seven TDD frames of configuration 0 through configuration 6 are illustrated. The TDD frame 407 of FIG. 4 corresponds to the configuration 1 of FIG. 6. Further, according to various embodiments of the present invention, besides the seven configurations of FIG. 6, other configurations having different rates of downlink subframes 602 and uplink subframes 604 and different arrangements of the downlink subframes 602 and the uplink subframes 604 can be used. For example, every subframe can be the downlink subframe 602.

The subframe indicated by 'S' in FIG. 6 is a special subframe 606 and includes a guard time for switching from the downlink to the uplink. The special subframe 606 can be configured as shown in FIG. 7.

Figure 7:
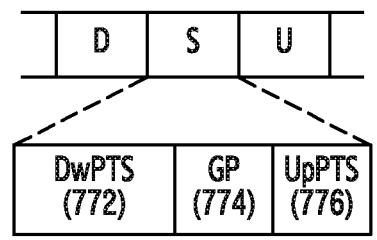
FIG. 7 depicts a structure of a guard time of a TDD frame in a wireless communication system according to an embodiment of the present invention.

FIG. 7 depicts a structure of a guard time of a TDD frame in a wireless communication system according to an embodiment of the present invention. Referring to FIG. 7, the special subframe 606 includes a Downlink Part (DwPTS) 772, a Guard Period (GP) 774, and an Uplink Part (UpPTS) 776. That is, part of the special subframe 606 can be used for downlink communication and part of it can be used for uplink communication. The GP 774 is not allocated to a terminal connected to a corresponding TDD cell. However, when operating the FDD-TDD CA, the terminal does not transmit an uplink signal over the TDD frame and accordingly a base station can use resources of the GP 774 and resources of the UpPTS 776 for downlink signal transmission to the terminal. Thus, efficiency of the resource utilization is improved.

Figure 8:
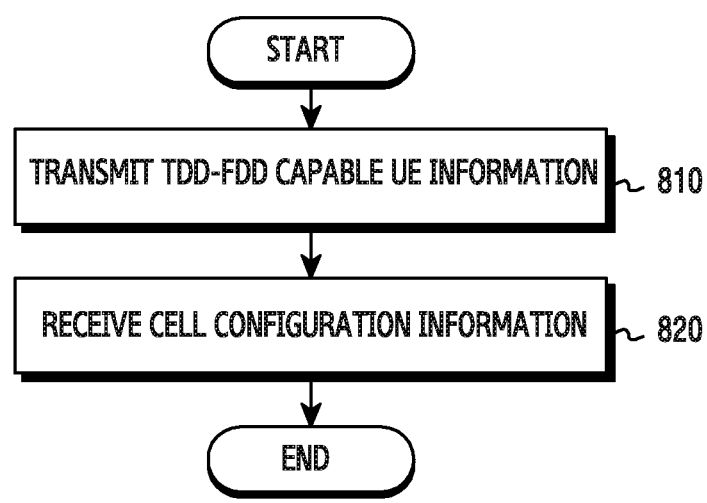
FIG. 8 depicts a signal transmitting and receiving procedure of a terminal in a wireless communication system according to an embodiment of the present invention.

FIG. 8 depicts a signal transmitting and receiving procedure of a terminal in a wireless communication system according to an embodiment of the present invention.

Referring to FIG. 8, in step 810, the terminal transmits a signal to the base station. The terminal transmits TDD-FDD CA support information to the base station. To provide the TDD-FDD CA support information to the base station, the terminal provides supportable band information to the base station. More specifically, the terminal can provide a carrier combination to the base station. When using both of the FDD and the TDD, the terminal can provide information in a form of {FDD band, TDD band}. For example, when the terminal provides the supportable band information of {Band 25, Band 41} to the base station, the Band 25 indicates the FDD band and the Band 41 indicates the TDD band. Hence, when receiving the information of {Band 25, Band 41} from the terminal, the base station can recognize that the terminal supports the TDD-FDD carriers. An example of a band message regarding the TDD-FDD CA support information is shown in Table 1 through Table 3.

TABLE 1

```
UE-EUTRA-Capability information element
— ASN1START
. . .
UE-EUTRA-Capability-v1020-IEs ::=        SEQUENCE {
    ue-Category-v1020              INTEGER (6..8)              OPTIONAL,
    phyLayerParameters-v1020       PhyLayerParameters-v1020    OPTIONAL,
    rf-Parameters-v1020            RF-Parameters-v1020         OPTIONAL,
    measParameters-v1020           MeasParameters-v1020        OPTIONAL,
    featureGroupIndRel10-r10       BIT STRING (SIZE (32))      OPTIONAL,
. . .
}
. . . ,
RF-Parameters-v1020 ::=            SEQUENCE {
    supportedBandCombination-r10       SupportedBandCombination-r10
}
. . .
---- ASN1STOP
```

TABLE 2

```
RRCConnectionReconfiguration message
— ASN1START
    . . .
    SCellToAddMod-r10 ::=   SEQUENCE {
      sCellIndex-r10          SCellIndex-r10,
      cellIdentification-r10    SEQUENCE {
        physCellId-r10          PhysCellId,
        dl-CarrierFreq-r10      ARFCN-ValueEUTRA
      }                                                    OPTIONAL,    ----- Cond
SCellAdd
        radioResourceConfigCommonSCell-r10     RadioResourceConfigCommonSCell-r10
OPTIONAL, ----- Cond SCellAdd
        radioResourceConfigDedicatedSCell-r10   RadioResourceConfigDedicatedSCell-r10
OPTIONAL,      ----- Cond SCellAdd2
      . . . ,
      [ [ dl-CarrierFreq-v1090          ARFCN-ValueEUTRA-v9e0 OPTIONAL  ----- Cond
BARFCN-max
      ] ]
    . . .
    ---- ASN1STOP
    RadioResourceConfigCommonSCell-r10 ::= SEQUENCE {
      . . .
      tdd-Config-r10             TDD-Config                    OPTIONAL
----- Cond TDDSCell
    },
```

TABLE 3

```
TDD-Config information element
— ASN1START
TDD-Config ::=                 SEQUENCE {
    subframeAssignment           EMUMERATED {
```

TABLE 3-continued

```
                            sa0, sa1, sa2, sa3, sa4, sa5, sa6, sa7,}
    specialSubframePatterns       ENMUMERATED {
                            ssp0, ssp1, ssp2, ssp3, ssp4, ssp5, ssp6,
ssp7, ssp8}
  }
  TDD-Config-v1130 ::=         SEQUENCE {
    specialSubframePatterns-v1130    ENUMERATED {ssp7, ssp9}
  }
---- ASN1STOP
```

In step 820, the terminal receives cell configuration information. The terminal receives uplink and downlink configuration information of a TDD secondary cell from the base station through a Radio Resource Control (RRC) signal. Based on the cell configuration information received from the base station, the terminal recognizes a TDD uplink subframe not carrying a Common Reference Signal (CRS) so as not to perform channel estimation on the uplink subframe. The frame according to an embodiment of the present invention includes a frame including only the downlink.

In step 830, the terminal connects to the base station. The terminal performs the TDD-FDD CA without estimating the channel in the recognized TDD uplink subframe not carrying the CRS.

Figure 9:
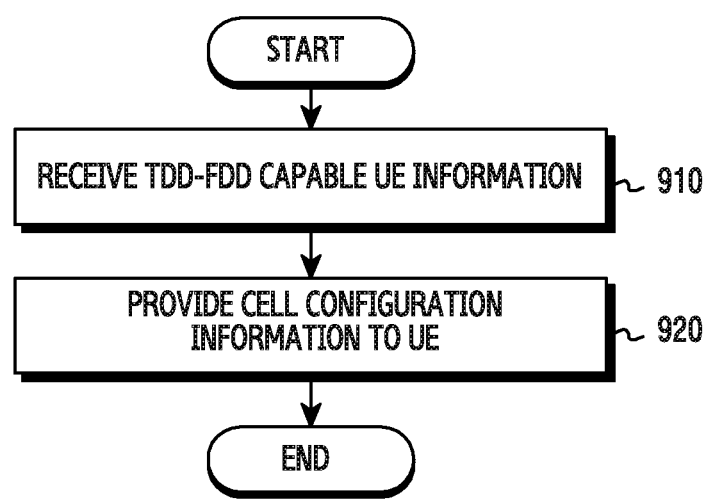
FIG. 9 depicts a signal transmitting and receiving procedure of a base station in a wireless communication system according to an embodiment of the present invention.

FIG. 9 depicts a signal transmitting and receiving procedure of a base station in a wireless communication system according to an embodiment of the present invention.

Referring to FIG. 9, in step 910, the base station receives a signal from the terminal. The base station receives TDD-FDD CA support information from the terminal. The TDD-FDD CA support information includes supportable band information. Specifically, for example, when the terminal uses both of the FDD and the TDD, the supportable band information can be offered in the form of {FDD band, TDD band}. For example, when the terminal provides the supportable band information of {Band 25, Band 41} to the base station, the Band 25 indicates the FDD band and the Band 41 indicates the TDD band. Hence, when receiving the information of {Band 25, Band 41} from the terminal, the base station can recognize that the terminal supports the TDD-FDD carriers.

In step 920, the base station transmits cell configuration information to the terminal. By sending uplink and downlink configuration information of a TDD secondary cell to the terminal, the base station allows the terminal to recognize a TDD uplink subframe not carrying a CRS based on the cell configuration information and not to perform the channel estimation on the uplink subframe.

Figure 10:
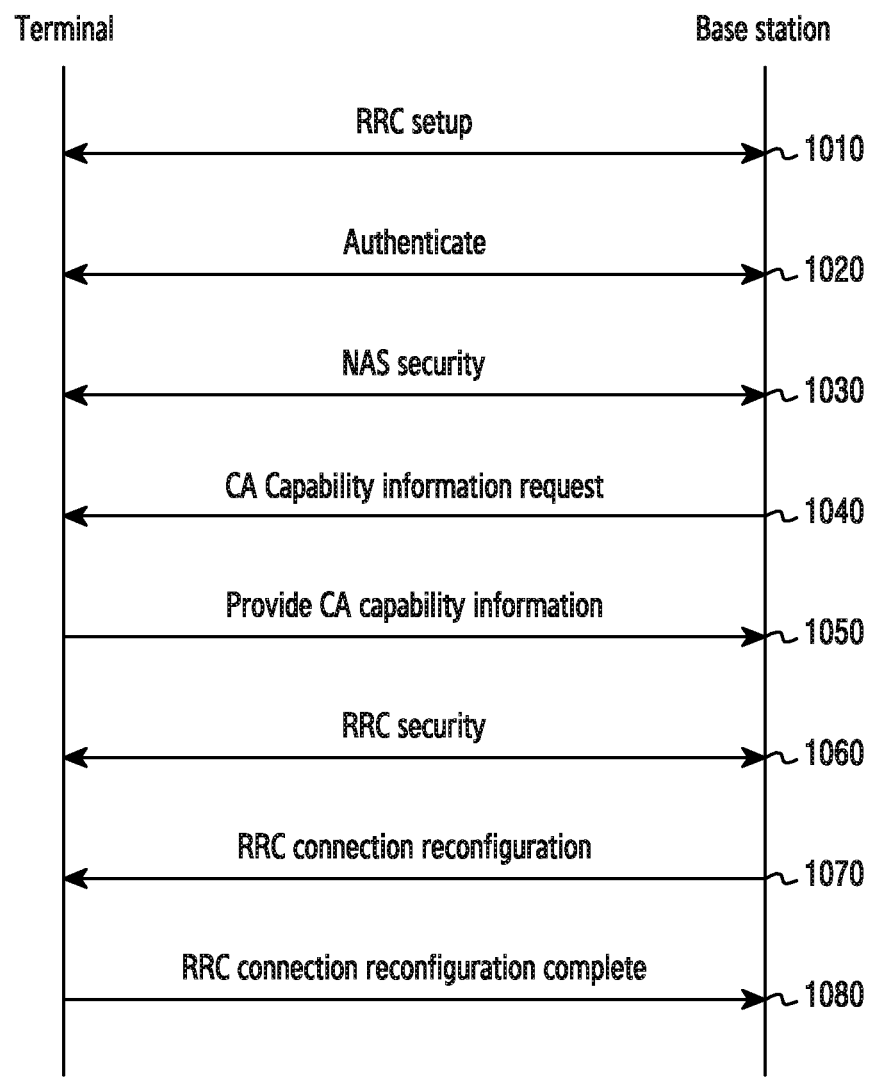
FIG. 10 depicts a signal exchange procedure of a terminal and a base station in a wireless communication system according to an embodiment of the present invention.

FIG. 10 depicts a signal exchange procedure of a terminal and a base station in a wireless communication system according to an embodiment of the present invention.

In step 1010, the terminal and the base station conduct RRC layer setup. For doing so, the terminal can send an RRC connection request message to the base station, the base station can send an RRC connection setup message to the terminal, and the terminal can send an RRC connection setup complete message to the base station.

In step 1020, the base station and the terminal perform authentication. In step 1030, the base station and the terminal perform a Non Access Stratum (NAS) security procedure to safely transmit a NAS message. In step 1040, the base station inquires of the terminal about CA capability information. Herein, the CA capability information includes CA mode information supported by the terminal.

In step 1050, the terminal transmits the CA capability information to the base station. Herein, the CA capability information includes the CA mode information supported by the terminal. The CA mode information includes information about accessible bands of the terminal. That is, the terminal transmits information of whether to support the CA to the base station. When supporting the CA, the terminal provides detailed capacity information for the CA. For example, the terminal can provide the base station with information notifying whether to support the TDD-FDD CA.

In step 1060, the base station and the terminal perform an RRC security procedure to safely send the RRC message. In step 1070, the base station sends an RRC connection reconfiguration message to the terminal. In so doing, when the terminal supports a particular CA mode, the base station can provide necessary information for the terminal to connect in the particular CA mode. That is, the base station can configure the CA to apply to the terminal based on the terminal capability information.

In step 1080, the terminal sends an RRC connection reconfiguration complete message to the base station. Hence, the terminal connects in the particular CA mode. According to an embodiment of the present invention, the terminal can connect in the TDD-FDD CA mode.

The secondary cell is managed in the RRC layer of the base station. For example, the base station checks whether the CA is supported through the RRC layer, manages channel measurement setup of a carrier allocable to the secondary cell and an allocated carrier, secondary cell addition, change, and release, secondary cell system information provision, and PUCCH resource setup, and performs primary cell activation and primary cell handover to enable the CA because the secondary cell exists. The base station manages activation and deactivation of the secondary cell added in the RRC layer, resource allocation and scheduling, and transport channel creation through a Media Access Control (MAC) layer. A procedure for the secondary management in the RRC layer is shown in FIG. 11.

Figure 11:
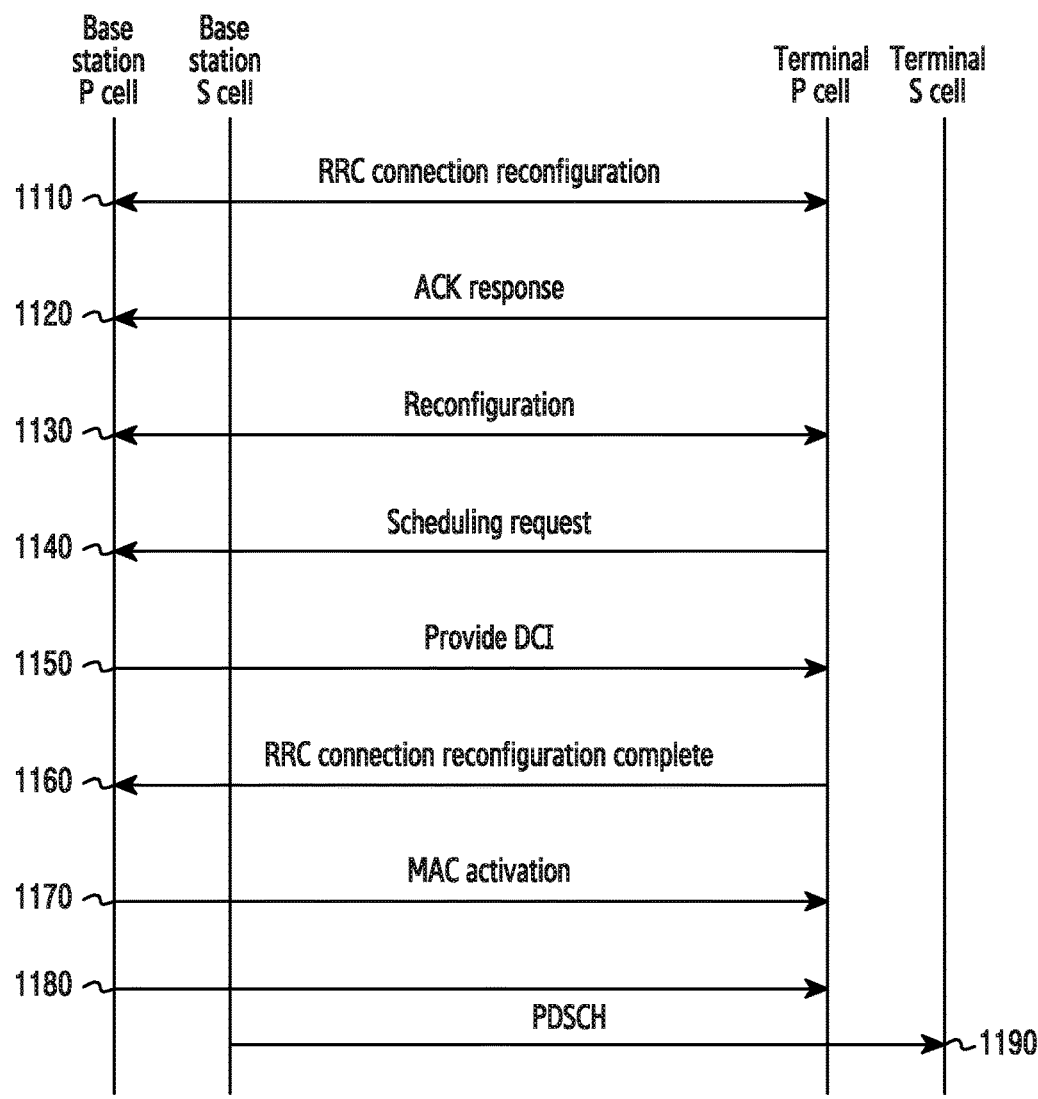
FIG. 11 depicts an example of a Radio Resource Control (RRC) connection reconfiguration procedure in a wireless communication system according to an embodiment of the present invention.

FIG. 11 depicts an example of an RRC connection reconfiguration procedure in a wireless communication system according to an embodiment of the present invention.

In step 1110, a primary cell of the base station sends an RRC connection reconfiguration message to a primary cell of the terminal. When the terminal supports a particular CA mode, the base station can provide RRC connection information so that the terminal can connect in the particular CA mode.

In step 1120, the terminal sends Hybrid Automatic Repeat reQuest (HARQ) Acknowledgement (ACK) information from a primary cell to the primary cell of the base station. The ACK signal is information for informing the base station of whether the terminal successfully receives the information. In response to the RRC connection reconfiguration message received from the base station, the terminal sends ACK information to the base station.

In step 1130, when the base station receives the ACK response from the terminal, the base station and the terminal reconfigures the connection information for the connection in a new mode. In step 1140, the primary cell of the terminal requests scheduling from the primary cell of the base station. The terminal receives information from the base station and requests the scheduling from the base station to allocate a resource for the RRC connection reconfiguration.

In step 1150, the base station provides Downlink Control Information (DCI) information from the primary cell to the primary cell of the terminal. The base station provides the DCI information in response to the scheduling allocation request of the terminal so that the terminal can be allocated the resource.

In step 1160, the terminal completes the RRC connection configuration from the primary cell to the primary cell of the base station. The terminal receives the RRC connection reconfiguration information from the base station, is allocated the resource, and completes the RRC connection reconfiguration. In step 1170, the secondary cell added through the MAC layer is activated from the primary cell of the base station to the primary cell of the base station. In steps 1180 and 1190, the primary cell and the secondary cell of the base station send Physical Downlink Shared Channel (PDSCH) information to the primary cell and the secondary cell of the terminal.

Figure 12:
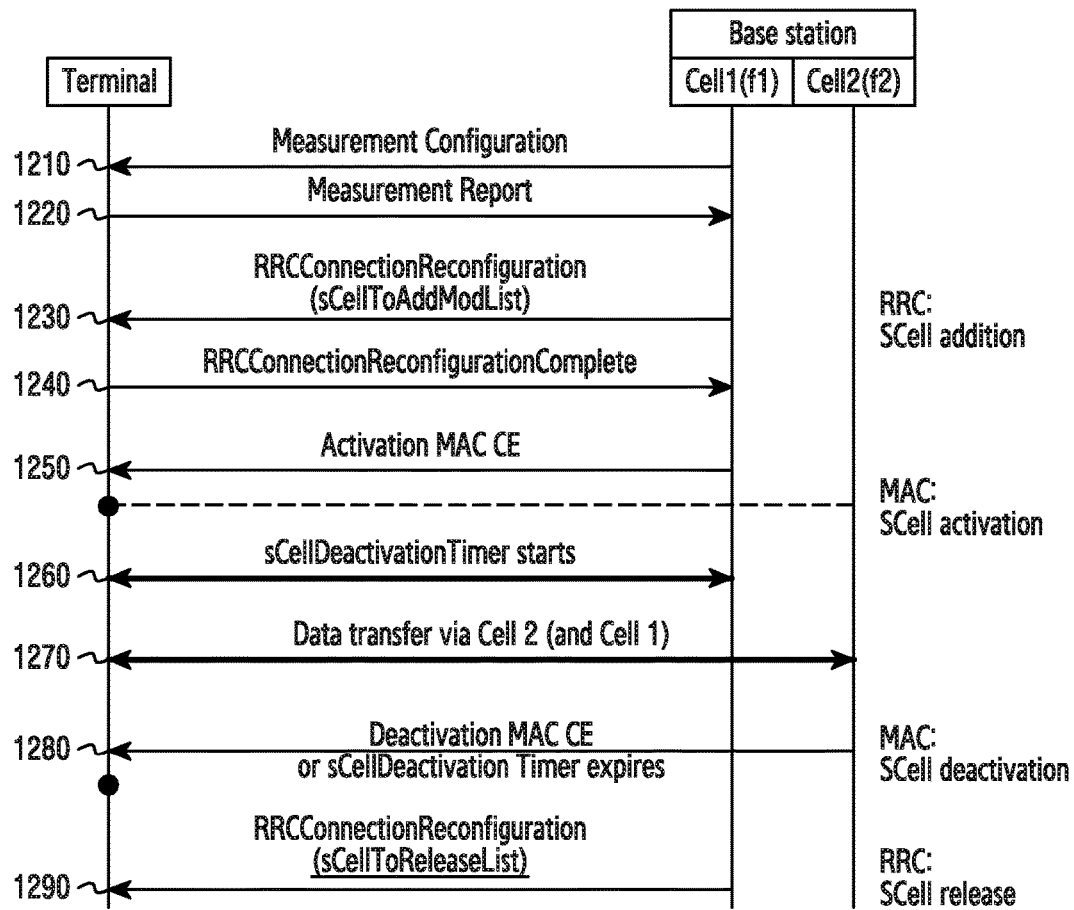
FIG. 12 depicts a control signaling procedure for CA in a wireless communication system according to an embodiment of the present invention.

FIG. 12 depicts a control signaling procedure for CA in a wireless communication system according to an embodiment of the present invention.

In step 1210, a first cell of the base station requests measurement configuration information from the terminal. The base station requests information to identify addition information of a secondary cell of the terminal.

In step 1220, the terminal transmits measurement report information to the first cell of the base station. The terminal transmits information about whether to add the secondary cell, to the base station.

In step 1230, the first cell of the base station transmits RRC connection reconfiguration information to the terminal. When receiving the information of the secondary cell addition from the terminal, the base station transmits RRC connection reconfiguration information to the terminal.

In step 1240, the terminal transmits RRC connection reconfiguration complete information to the first cell of the base station. When receiving the RRC connection reconfiguration information from the base station, the terminal completes the RRC connection reconfiguration by adding a second cell as the secondary cell and applying the secondary cell configuration.

In step 1250, the first cell of the base station transmits MAC activation information to the terminal. The base station activates the cell through the MAC layer.

In steps 1260 and 1270, data is transmitted via the second cell and the first cell.

In step 1280, the second cell of the base station sends a MAC deactivation message to the terminal. When a certain time passes, the base station deactivates the cell through the MAC layer.

In step 1290, the first cell of the base station transmits RRC connection reconfiguration information to the terminal. The base station performs the RRC connection reconfiguration to release the secondary cell.

Figure 13:
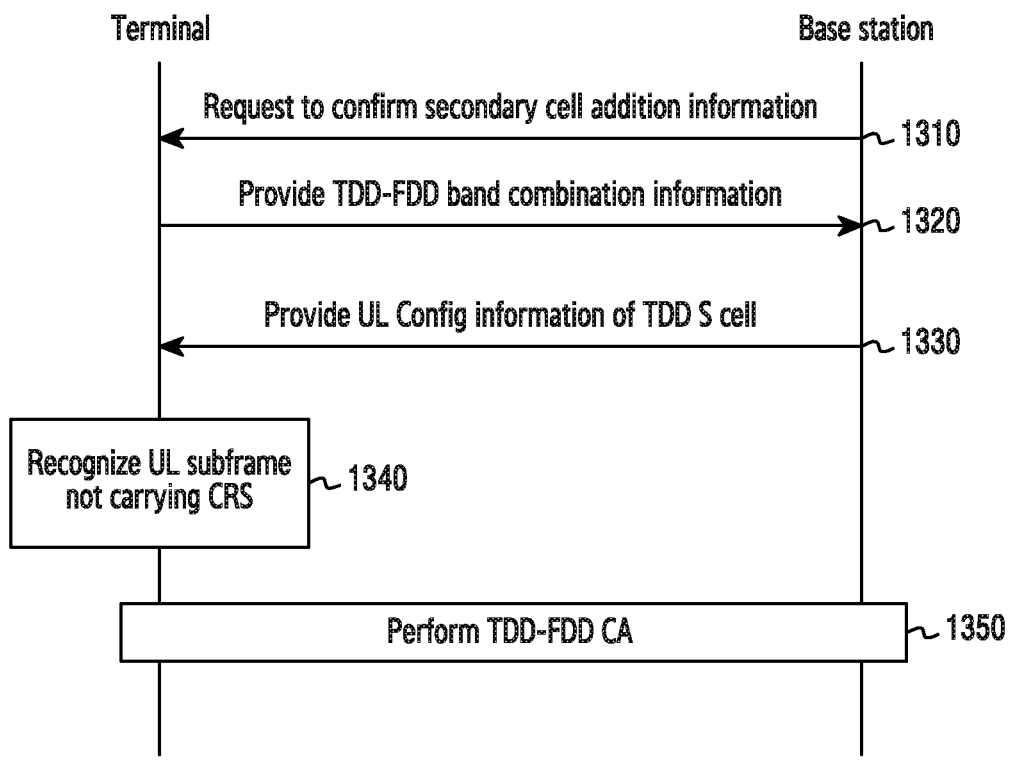
FIG. 13 depicts a signal exchange procedure for CA in a wireless communication system according to an embodiment of the present invention.

FIG. 13 depicts a signal exchange procedure for CA in a wireless communication system according to an embodiment of the present invention.

Referring to FIG. 13, in step 1310, the base station requests information for obtaining secondary cell addition information of the terminal. In step 1320, the terminal transmits CA capability information to the base station. The CA capability information includes information notifying that the terminal can perform the TDD-FDD CA. For example, the CA capability information can include supportable band information of the terminal. That is, when notifying the TDD-FDD CA support, the CA capability information can include, as the supportable band information of the terminal, at least one TDD band information and at least one FDD band information.

In step 1330, the base station transmits TDD cell configuration information. The base station transmits uplink and downlink configuration information of a TDD secondary cell to the terminal through an RRC signal. For example, the TDD cell configuration information can include configuration information of a TDD frame used in the TDD cell. More specifically, the TDD cell configuration information can include at least one of a rate of downlink subframes and uplink subframes, arrangement of the downlink subframes and the uplink subframes, and identification information indicating a predefined configuration for the rate and the arrangement. Herein, the indictable frame configurations include a configuration where all of subframes are downlink subframes.

In step 1340, the terminal recognizes a subframe not carrying a CRS in the TDD frame. For example, the subframe not carrying the CRS is the uplink subframe. That is, the terminal can recognize the TDD uplink subframe not carrying the CRS based on the TDD cell configuration information received from the base station. Thus, the terminal can prevent a malfunction by avoiding channel estimation on the uplink subframe.

In step 1350, the terminal operates the TDD-FDD CA. The terminal performs the CA with the base station over other subframes than the uplink frames of the TDD cell and the FDD cell based on the cell configuration information received from the base station. For doing so, the terminal and the base station can further perform signaling to configure and activate the TDD cell, which is not illustrated in FIG. 13.

Figure 14A:
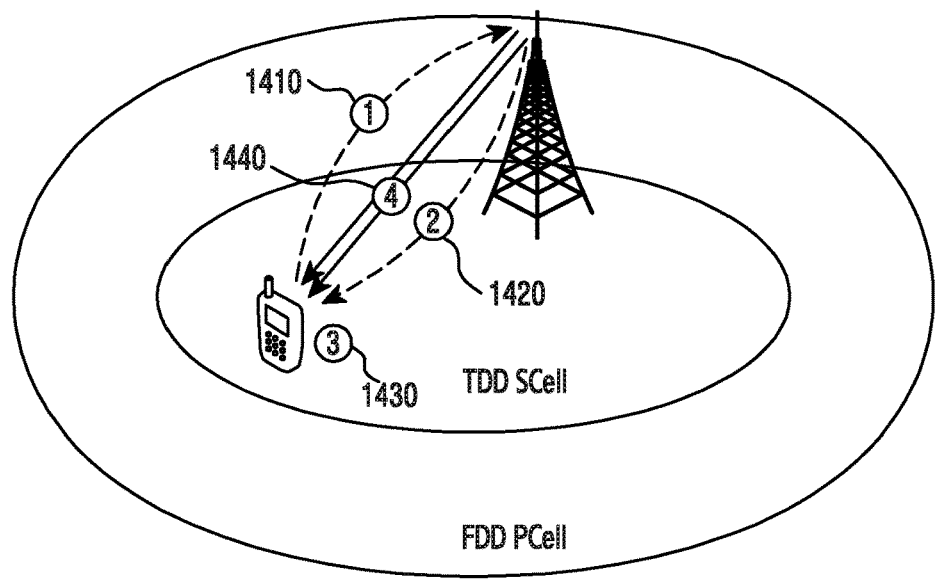
FIGS. 14A and 14B depict a configuration procedure for CA in a wireless communication system according to an embodiment of the present invention.
Figure 14B:
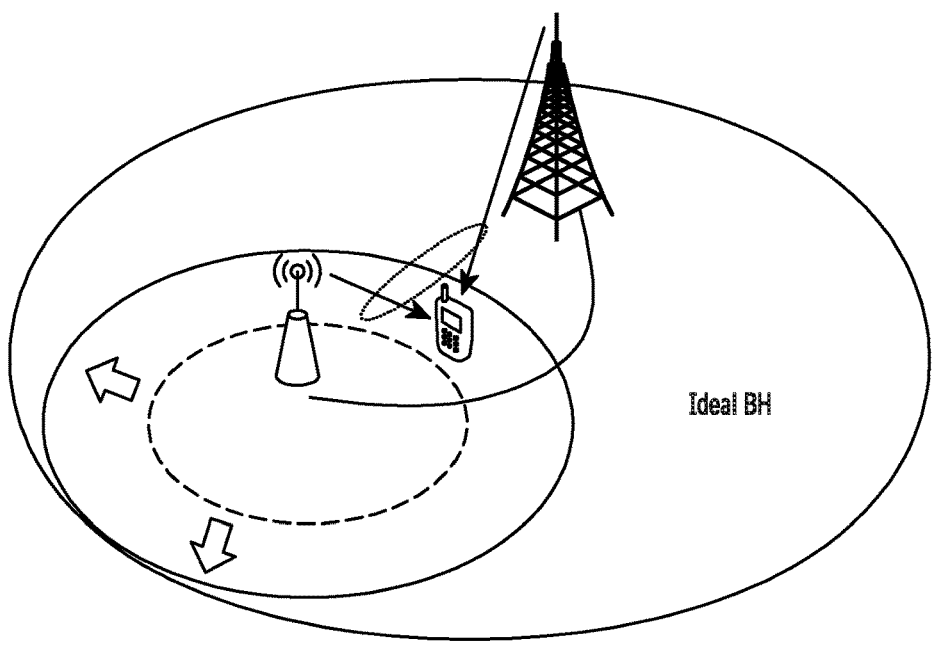

FIGS. 14A and 14B depict signal exchange operations for CA in a wireless communication system according to an embodiment of the present invention. The signal exchange for the CA according to the present invention includes signal exchange between macro cells and signal exchange between a macro cell and a small cell in FIG. 14A.

Referring to FIGS. 14A and 14B, in step 1410, the terminal transmits CA capability information to the base station. The CA capability information includes information notifying that the terminal can perform the TDD-FDD CA. For example, the CA capability information can include supportable band information of the terminal. That is, when notifying the TDD-FDD CA support, the CA capability information can include, as the supportable band information of the terminal, at least one TDD band information and at least one FDD band information.

In step 1420, the base station transmits TDD cell configuration information. The base station transmits uplink and downlink configuration information of a TDD secondary cell to the terminal using an RRC signal. For example, the TDD cell configuration information can include configuration information of a TDD frame used in the TDD cell. More specifically, the TDD cell configuration information can include at least one of a rate of downlink subframes and uplink subframes, arrangement of the downlink subframes and the uplink subframes, and identification information indicating a predefined configuration for the rate and the arrangement. Herein, the indictable frame configurations include a configuration where all of subframes are downlink subframes.

In step 1430, the terminal recognizes a subframe not carrying a CRS in the TDD frame. For example, the subframe not carrying the CRS is the uplink subframe. That is, the terminal can recognize the TDD uplink subframe not carrying the CRS based on the TDD cell configuration information received from the base station. Thus, the terminal can prevent a malfunction by avoiding channel estimation on the uplink subframe.

In step 1440, the terminal operates the TDD-FDD CA. The terminal performs the CA with the base station over other subframes than the uplink frames of the TDD cell and the FDD cell based on the cell configuration information received from the base station. For doing so, the terminal and the base station can further perform signaling to configure and activate the TDD cell, which is not illustrated in FIGS. 14A and 14B.

Figure 15:
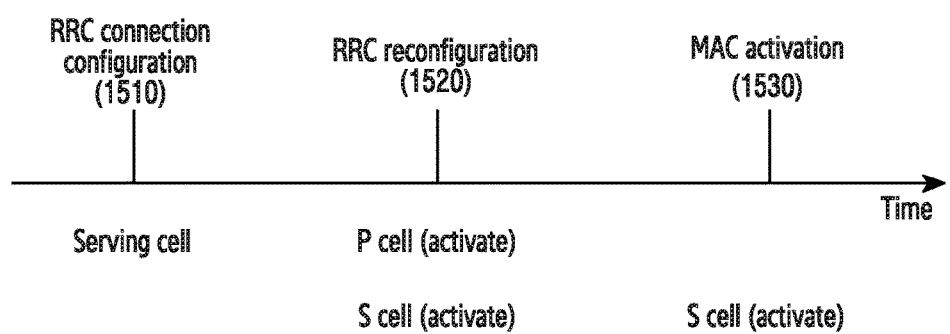
FIG. 15 depicts an example of a frame structure of a TDD cell including only downlinks in a wireless communication system according to an embodiment of the present invention.

FIG. 15 depicts a configuration procedure for CA in a wireless communication system according to an embodiment of the present invention.

In step 1510, the base station initially configures the RRC layer.

In step 1520, the base station performs the RRC reconfiguration. The base station activates the primary cell through the RRC layer. When the terminal measures a Reference Signal Received Power (RSRP) and transmits a measurement result to the base station, the base station receives the measurement result and activates the primary cell. More specifically, the secondary cell management according to a trigger event provided from the terminal to the base station is as follows.

TABLE 4

| event name | content | operation |
|---|---|---|
| Event A1 | The quality of the serving base station is higher than the threshold | activating the secondary cell |
| Event A2 | The quality of the serving base station is lower than the threshold | removing the secondary cell |
| Event A3 | The offset of the neighboring base station is higher than the serving base station | |
| Event A4 | The quality of the neighboring base station is higher than the threshold | adding the secondary cell |
| Event A5 | The quality of the serving base station is lower than the first threshold, the quality of the neighboring base station is higher than the second threshold | handing-over the primary cell |
| Event A6 | The offset of the neighbor base station is superior to the secondary cell. | substituting the secondary cell |

In step 1530, the base station activates and deactivates the secondary cell through the MAC layer. The MAC layer has an available secondary cell, and can, if necessary, activate the secondary cell. Secondary cell activation indication is conducted through MAC control element in the primary cell subframe. The MAC may directly determine to deactivate the secondary cell, and may automatically deactivate the secondary cell when a time passes.

When the terminal configures the CA, that is, configures two or more serving cells, the terminal reports Channel State Information (CSI) per serving cell according to separate configuration. For example, the configuration can include 'cqi-pmiConfigIndex' and 'ri-configIndex'. In so doing, the terminal operating the FDD-TDD CA can report both of the CSI of the FDD cell and the CSI of the TDD cell over the FDD cell, that is, over the primary cell.

In case of periodic CSI report, the terminal can report the CSI using an uplink control channel (e.g., PUCCH). A configurable set of a Channel Quality Indicator (CQI)/Precoding Matrix Index (PMI) report period for the periodic CSI report can differ in the FDD cell and the TDD cell. For example, in the FDD cell, a selectable period set can be, when expressed as the number of the subframes, {2, 5, 10, 20, 40, 80, 160, 32, 64, 128}. In the TDD, a selectable period set can be, when expressed as the number of the subframes, {1, 5, 10, 20, 40, 80, 160}.

In case of aperiodic CSI report, the terminal can report the CSI using an uplink data channel (e.g., Physical Uplink Shared Channel (PUSCH)) scheduled. For example, the terminal can aperiodically report the CSI according to a decoding result of uplink Downlink Control Information (DCI) format 0/4 in the subframe.

Figure 16:
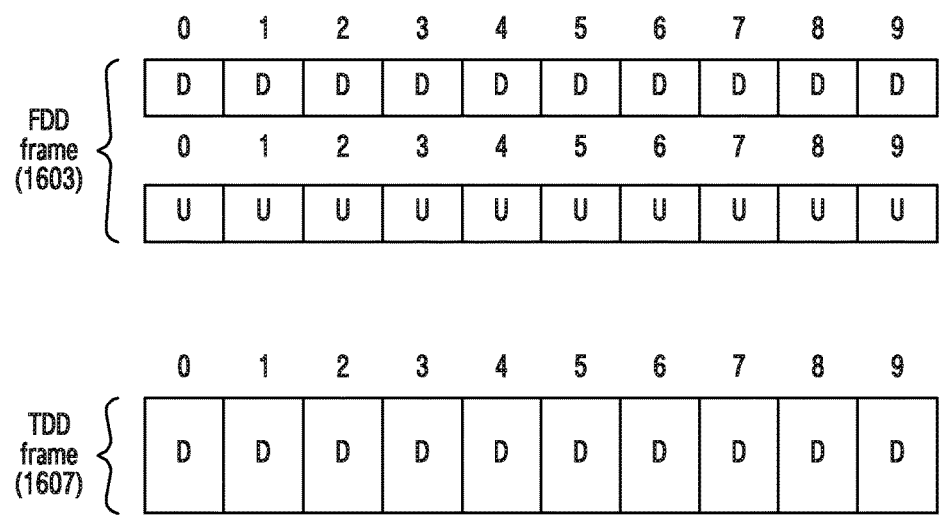
FIG. 16 depicts an example of secondary cell configuration activation or deactivation in a wireless communication system according to an embodiment of the present invention.

FIG. 16 depicts an example of a TDD cell frame structure including only downlinks in a wireless communication system according to an embodiment of the present invention.

Referring to FIG. 16, an FDD frame 1603 and a TDD frame 1607 each include ten subframes. The FDD frame 1603 includes ten downlink subframes and ten uplink subframes divided on a frequency axis, and the TDD frame 1607 includes six downlink subframes and four uplink subframes. The frame structure according to an embodiment of the present invention includes a frame including only the downlinks. Since the terminal supporting the TDD-FDD does not estimate a CRS channel in the uplink cell of the TDD frame, resources in every cell can be used when the frame including only the downlinks is used.

Figure 17:
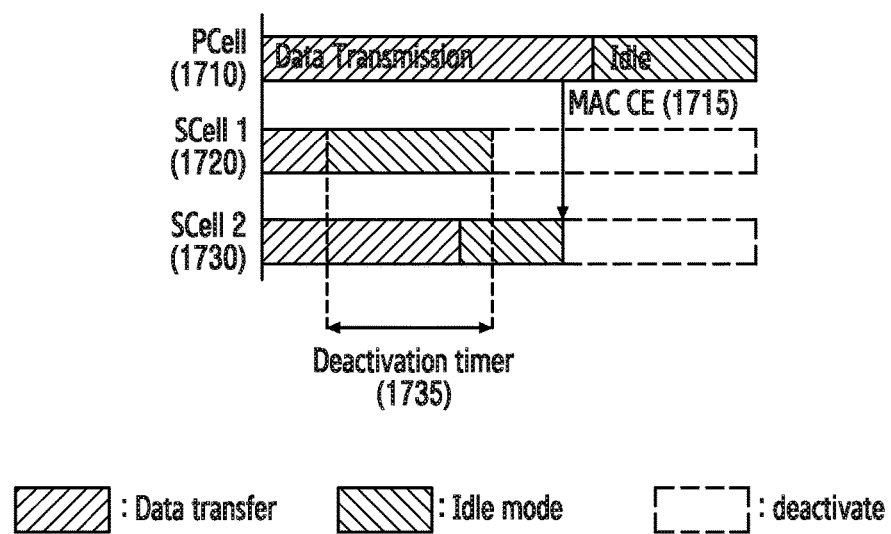
FIG. 17 depicts a block diagram of a terminal apparatus for performing CA in a wireless communication system according to an embodiment of the present invention.

FIG. 17 depicts an example of secondary cell configuration activation or deactivation in a wireless communication system according to an embodiment of the present invention. Referring to FIG. 17, a CA mode including a Primary Cell (PCell) 1710, a first Secondary Cell (SCell) 1720, and a second Scell 1730 is in progress. Initially, data is transmitted over all of the PCell 1710, the first SCell 1720, and the second SCell 1730. Next, the first SCell 1720 switches to an idle mode and maintains the idle mode during a deactivation timer 1735, and thus the first SCell 1720 is deactivated. Also, due to other factor such as channel quality degradation, the base station can determine to deactivate the second SCell 1720. In this case, a MAC Control Element (CE) indicating the deactivation of the second SCell 1720 is transmitted over the primary cell 1710, and the second SCell 1720 is deactivated. Next, the PCell 1710 can switch to the idle mode.

Figure 18:
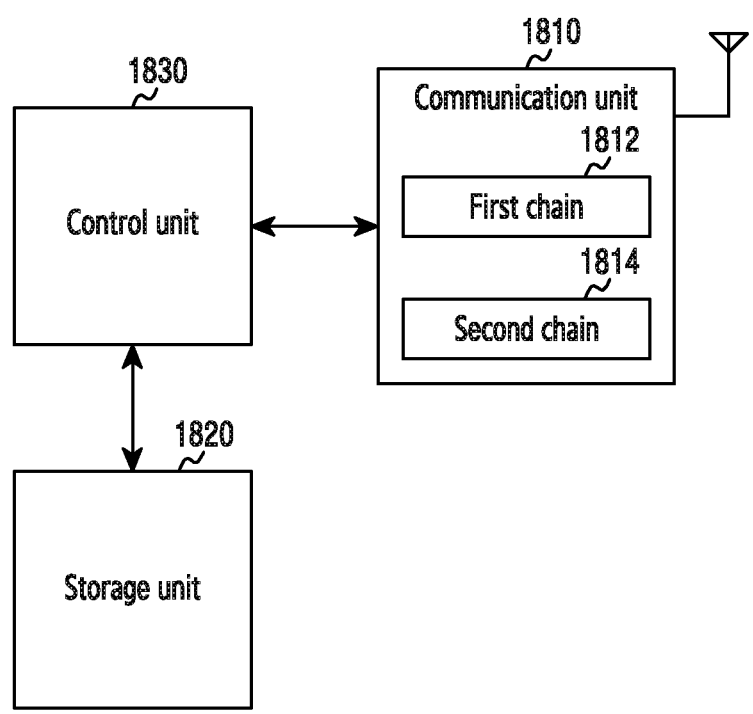
FIG. 18 depicts a block diagram of a base station apparatus for performing CA in a wireless communication system according to an embodiment of the present invention.

FIG. 18 depicts a block diagram of a terminal apparatus for performing CA in a wireless communication system according to an embodiment of the present invention.

Referring to FIG. 18, the apparatus includes a communication unit 1810, a storage unit 1820, and a control unit 1830.

The wireless communication unit 1810 performs functions such as signal band conversion and amplification, for transmitting and receiving signals over a radio channel. That is, the wireless communication unit 1810 up-converts a baseband signal to a Radio Frequency (RF) signal and then transmits it over an antenna, and down-converts an RF signal received over the antenna to a baseband signal. For example, the wireless communication unit 1810 can include a transmit filter, a receive filter, an amplifier, a mixer, an oscillator, a Digital to Analog Converter (DAC), and an Analog to Digital Converter (ADC). Although the single antenna is depicted in FIG. 18, the transmitting stage can include a plurality of antennas. Also, the wireless communication unit includes a first chain 1812 and a second chain 1814. The wireless communication unit 1810 can be referred to as a transmitter, a receiver, a transceiver, or a communication unit.

The storage unit 1820 stores a basic program for the operations of the apparatus for the CA execution, an application program, and data such as configuration information. In particular, the storage unit 1820 can store information about whether the CA is supported. The storage unit 1820 provides the stored data according to a request of the control unit 1830.

The control unit 1830 controls general operations of an base station apparatus for the CA execution. For example, the control unit 1830 connects to the base station by sending a signal through the communication unit 1810. The control unit controls the apparatus for the CA to execute the procedures of FIG. 8, FIG. 9, FIG. 10, FIG. 11, FIG. 12, and FIG. 13. The operations of the control unit 1830 according to an embodiment of the present invention are as follows.

The control unit 1830 controls the terminal to send a signal to the base station. The control unit transmits TDD-FDD CA support information to the base station through the terminal. To provide the TDD-FDD CA support information to the base station, the control unit provides supportable band information to the base station. Specifically, the control unit can provide a carrier combination to the base station. Based on uplink and downlink configuration information of a TDD secondary cell received from the base station, the control unit recognizes the TDD uplink subframe not carrying the CRS and thus disables channel estimation on the uplink subframe.

Figure 19:
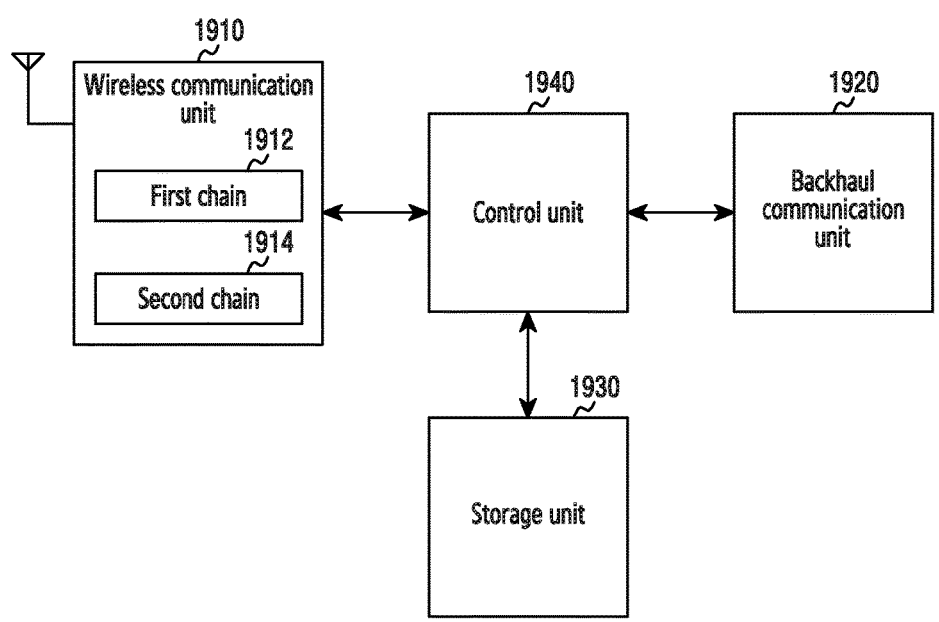
FIG. 19 depicts a block diagram of a base station apparatus for performing CA in a wireless communication system according to an embodiment of the present invention.

FIG. 19 depicts a block diagram of a base station apparatus for performing CA in a wireless communication system according to an embodiment of the present invention.

Referring to FIG. 19, the apparatus includes a wireless communication unit 1910, a backhaul communication unit 1920, a storage unit 1930, and a control unit 1940.

The wireless communication unit 1910 performs functions such as signal band conversion and amplification, for transmitting and receiving signals over a radio channel. That is, the wireless communication unit 1910 up-converts a baseband signal to an RF signal and then transmits it over an antenna, and down-converts an RF signal received over the antenna to a baseband signal. For example, the wireless communication unit 1910 can include a transmit filter, a receive filter, an amplifier, a mixer, an oscillator, a DAC, and an ADC. Although the single antenna is depicted in FIG. 19, the transmitting stage can include a plurality of antennas. Also, the wireless communication unit includes a first chain 1912 and a second chain 1914. The wireless communication unit 1910 can be referred to as a transmitter, a receiver, a transceiver, or a communication unit.

The backhaul communication unit 1920 provides an interface for communicating with other nodes in a network. That is, the backhaul communication unit 1920 converts a bit string transmitted from the base station to other node, for example, to another base station or a core network, to a physical signal, and converts a physical signal received from the other node to a bit string.

The storage unit 1930 stores a basic program for the operations of the base station apparatus for the CA execution, an application program, and data such as configuration information. In particular, the storage unit 1930 can store information about whether the CA is supported. The storage unit 1930 provides the stored data according to a request of the control unit 1940.

The control unit 1940 controls general operations of the base station apparatus for the CA execution. For example, the control unit 1940 transmits a signal to the terminal through the wireless communication unit 1910. The control unit controls the apparatus for the CA execution to perform the procedures of FIG. 8, FIG. 9, FIG. 10, FIG. 11, FIG. 12, and FIG. 13. The operations of the control unit 1940 according to an embodiment of the present invention are as follows.

The control unit 1940 controls the base station to transmit a signal to the terminal. The control unit controls to transmit the uplink and downlink configuration information of the TDD secondary cell to the terminal through TDD-FDD CA support information received at the base station.

The methods described according to claims or various embodiments of the present invention can be implemented in software, firmware, hardware, or in their combinations.

As for the software, a computer-readable storage medium storing one or more programs (software modules) can be provided. One or more programs stored in the computer-readable storage medium can be configured for execution by one or more processors in an electronic device. One or more programs can include instructions for controlling the electronic device to execute the methods described according to claims or various embodiments of the present invention.

Such a program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the program can be stored to a memory combining part or all of those recording media. Also, a plurality of memories may be included.

The program can be stored in an attachable storage device accessible via a communication network such as Internet, Intranet, Local Area Network (LAN), Wide LAN (WLAN), or Storage Area Network (SAN), or a communication network by combining these networks. The storage device can access the device of the present invention through an external port. Also, a separate storage device may access the device of the present invention over the communication network.

In the specific embodiments of the present invention, the elements included in the invention are expressed in a singular or plural form. However, the singular or plural expression is appropriately selected according to a proposed situation for the convenience of explanation and the present invention is not limited to a single element or a plurality of elements. The elements expressed in the plural form may be configured as a single element and the elements expressed in the singular form may be configured as a plurality of elements.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. An apparatus for a terminal in a wireless communication system, the apparatus comprising:
a transceiver configured to:
transmit, to a base station, through a first carrier for a primary cell, a first message, notifying that the terminal supports time division duplex (TDD) frequency division duplex (FDD) carrier aggregation (CA) using the first carrier based on the FDD and a second carrier based on the TDD, wherein the first message comprises information regarding a supportable combination of frequency bands including a first band among frequency bands used for FDD and a second band among frequency bands used for TDD, and
if the base station determines to configure the terminal to perform the TDD-FDD CA based on the first message, receive, from the base station, through the first carrier, a second message for indicating to add a secondary cell at the second carrier, wherein the second message comprises an index of the secondary cell and frame configuration information for the second carrier; and
at least one processor configured to:
identify at least one uplink subframe for the second carrier based on the frame configuration information, and
perform the TDD-FDD CA to communicate with the base station without estimating downlink channel on the at least one uplink subframe based on the frame configuration information of the second carrier,
wherein the first carrier is used to perform downlink communications and uplink communications based on the FDD,
wherein the second carrier is used to perform downlink communications without uplink communications according to the frame configuration information, and
wherein downlink data received through the second carrier is received through at least one downlink subframe identified by the frame configuration information.

2. The apparatus of claim 1, wherein the frame configuration information comprises at least one of:
a rate of downlink subframes and uplink subframes,
an arrangement of the downlink subframes and the uplink subframes, or
an identification indicating the rate or the arrangement among predefined rates or predefined arrangement.

3. The apparatus of claim 1, wherein the transceiver is further configured to receive, from the base station, through the first carrier, a third message for inquiring information regarding a capability associated with the CA, before transmitting the first message.

4. The apparatus of claim 1, wherein the at least one processor is further configured to identify at least one subframe not carrying common reference signals (CRS) based on the frame configuration information for the second carrier.

5. The apparatus of claim 1, wherein the transceiver is further configured to:
receive, from the base station, through the first carrier, a fourth message for requesting information to identify addition information of the secondary cell, the fourth message including a configuration for measurement of the secondary cell, and
transmit, to the base station, through the first carrier, a fifth message including information about whether to add the secondary cell, the fifth message including measurement report for the secondary cell.

6. The apparatus of claim 1, wherein the transceiver is further configured to:
receive, from the base station, a media access control (MAC) control element (CE) for activating the secondary cell.

7. A method for operating a terminal in a wireless communication system, the method comprising:
transmitting, to a base station, through a first carrier for a primary cell, a first message including, information notifying that the terminal supports time division duplex (TDD), frequency division duplex (FDD), carrier aggregation (CA), using the first carrier based on the FDD and a second carrier based on the TDD, wherein the first message comprises information regarding a supportable combination of frequency bands including a first band among frequency bands used for FDD and a second band among frequency bands used for TDD;
if the base station determines to configure the terminal to perform the TDD-FDD CA based on the first message, receiving, from the base station, through the first carrier, a second message for indicating to add a secondary cell at the second carrier, wherein the second message comprises an index of the secondary cell and frame configuration information for the second carrier;
identifying at least one uplink subframe for the second carrier based on the frame configuration information; and
performing the TDD-FDD CA to communicate with the base station without estimating downlink channel on the identified at least one uplink subframe based on the frame configuration information of the second carrier,
wherein the first carrier is used to perform downlink communications and uplink communications based on the FDD,
wherein the second carrier is used to perform downlink communications without uplink communications according to the frame configuration information, and
wherein the downlink data received through the second carrier is received through at least one downlink subframe identified by the frame configuration information.

8. The method of claim 7, wherein the frame configuration information comprises at least one of:
a rate of downlink subframes and uplink subframes,
an arrangement of the downlink subframes and the uplink subframes, or
an identification indicating the rate or the arrangement among predefined rates or predefined arrangement.

9. The method of claim 7, further comprising:
receiving, from the base station, through the first carrier, a third message for inquiring information regarding a capability associated with the CA, before transmitting the first message.

10. The method of claim 7, wherein the identifying of the at least one uplink subframe comprises:
identifying at least one subframe not carrying common reference signals (CRS) based on the frame configuration information for the second carrier.

11. The method of claim 7, further comprising:
receiving, from the base station, through the first carrier, a fourth message for requesting information to identify addition information of the secondary cell, the fourth message including a configuration for measurement of the secondary cell; and
transmitting, to the base station, through the first carrier, a fifth message including information about whether to add the secondary cell, the fifth message including measurement report for the secondary cell.

12. The method of claim 7, further comprising:
receive, from the base station, a media access control (MAC) control element (CE) for activating the secondary cell.

13. An apparatus for a base station in a wireless communication system, the apparatus comprising:
a transceiver configured to:
   receive, from a terminal, through a first carrier for a primary cell, a first message notifying that the terminal supports time division duplex (TDD)-frequency division duplex (FDD) carrier aggregation (CA) using the first carrier based on the FDD and a second carrier based on the TDD, wherein the first message comprises information regarding a supportable combination of frequency bands including a first band among frequency bands used for FDD and a second band among frequency bands used for TDD,
   if the base station determines to configure the terminal to perform the TDD-FDD CA based on the first message, transmit, to the terminal, through the first carrier, a second message for indicating to add a secondary cell at the second carrier, wherein the second message comprises an index of the secondary cell and frame configuration information for the second carrier; and
at least one processor configured to perform the TDD-FDD CA to communicate with the terminal that performs the TDD-FDD CA to communicate with the base station without estimating downlink channel on at least one uplink subframe for the second carrier based on the frame configuration information for the second carrier
wherein the at least one uplink subframe is identified based on the frame configuration information,
wherein the first carrier is used to perform downlink communications and uplink communications based on the FDD,
wherein the second carrier is used to perform downlink communications without uplink communications according to the frame configuration information, and
wherein the downlink data transmitted through the second carrier is transmitted through at least one downlink subframe identified by the frame configuration information.

14. The apparatus of claim 13, wherein the frame configuration information comprises at least one of:
a rate of downlink subframes and uplink subframes,
an arrangement of the downlink subframes and the uplink subframes, or
an identification indicating the rate or the arrangement among predefined rates or predefined arrangement.

15. The apparatus of claim 13, wherein the transceiver is further configured to transmit, to the terminal, through the first carrier, a third message for inquiring information regarding a capability associated with the CA, before receiving the first message.

16. The apparatus of claim 13, wherein the transceiver is further configured to:
transmit, to the terminal, through the first carrier, a fourth message for requesting information to identify addition information of the secondary cell, the fourth message including a configuration for measurement of the secondary cell, and
receive, from the terminal, through the first carrier, a fifth message including information about whether to add the secondary cell, the fifth message including measurement report for the secondary cell.

17. The apparatus of claim 13, wherein the transceiver is further configured to:
transmit, to the terminal, a media access control (MAC) control element (CE) for activating the secondary cell.

* * * * *